United States Patent [19]

Kaiser, II

[11] Patent Number: 5,306,029
[45] Date of Patent: Apr. 26, 1994

[54] COOLER CADDY, AND METHODS OF CONSTRUCTING AND UTILIZING SAME

[76] Inventor: Ronald R. Kaiser, II, 12060 Cavell, Livonia, Mich. 48150

[21] Appl. No.: 709,208

[22] Filed: Jun. 3, 1991

[51] Int. Cl.⁵ .................................................. B62B 3/02
[52] U.S. Cl. ........................................ 280/30; 108/80; 280/47.34; 280/79.2; 296/22
[58] Field of Search ............... 296/22; 280/30, 37, 280/47.371, 47.34, 651, 35, 638, 79.2; 108/48, 69, 77, 80

[56] References Cited

U.S. PATENT DOCUMENTS

| | | | |
|---|---|---|---|
| 522,058 | 6/1894 | Hiett et al. | 108/48 X |
| 1,455,395 | 5/1923 | Exum | 296/22 X |
| 1,964,805 | 7/1934 | Barnes | 296/22 X |
| 2,603,500 | 7/1952 | Messier | 280/30 |
| 2,604,333 | 7/1952 | Elmer | 280/37 |
| 3,266,813 | 8/1966 | Bosko et al. | 280/8 |
| 3,873,114 | 3/1975 | Brown | 280/30 |
| 3,889,967 | 6/1975 | Sauer | 280/47.35 |
| 3,940,175 | 2/1976 | Robison | 296/22 |
| 3,944,241 | 3/1976 | Epelbaum | 280/30 |
| 4,009,762 | 3/1977 | Bjerkgard | 280/30 X |
| 4,066,023 | 1/1978 | Hughes | 108/69 X |
| 4,706,817 | 11/1987 | Greathouse | 206/545 |
| 4,762,331 | 8/1988 | Tucker et al. | 280/30 |
| 4,796,909 | 1/1989 | Kirkendall | 280/65.1 |
| 4,846,493 | 7/1989 | Mason | 280/655 X |
| 4,887,836 | 12/1989 | Simjian | 280/651 |

Primary Examiner—Eric D. Culbreth
Assistant Examiner—Michael Mar
Attorney, Agent, or Firm—Irving M. Weiner; Joseph P. Carrier; Pamela S. Burt

[57] ABSTRACT

A device for transporting food and food related items including an insulated container having foldable all-terrain wheels, foldable tray members, and a telescoping handle. Tie-down hooks are provided to permit securement of a saddlebag to the device. The saddlebag will provide increased transporting capacity. The tray members may be locked into a horizontal use position to support plates, beverages, food containers, etc. An auxiliary support pole may be attached to the container to support an umbrella or light.

15 Claims, 5 Drawing Sheets

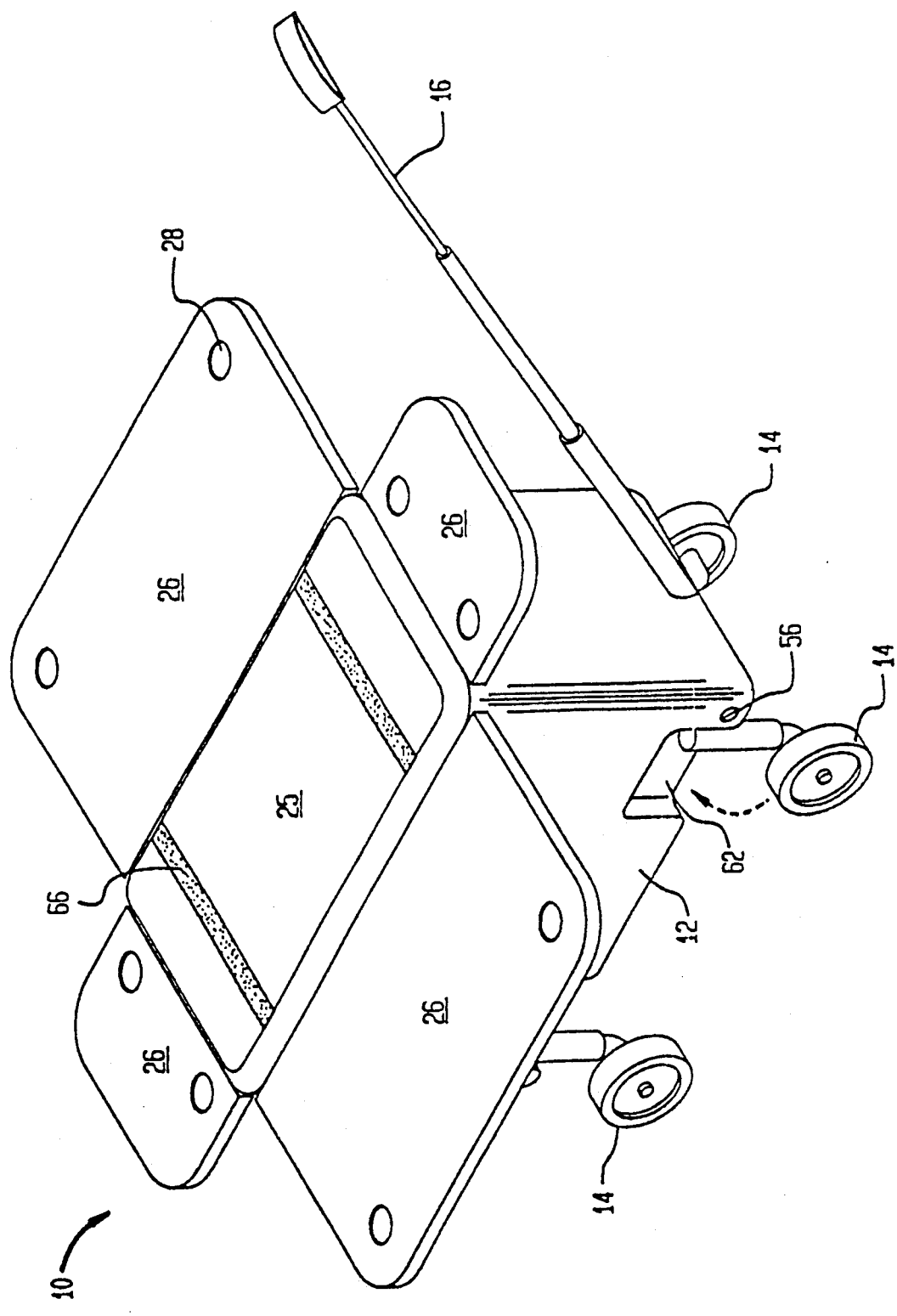

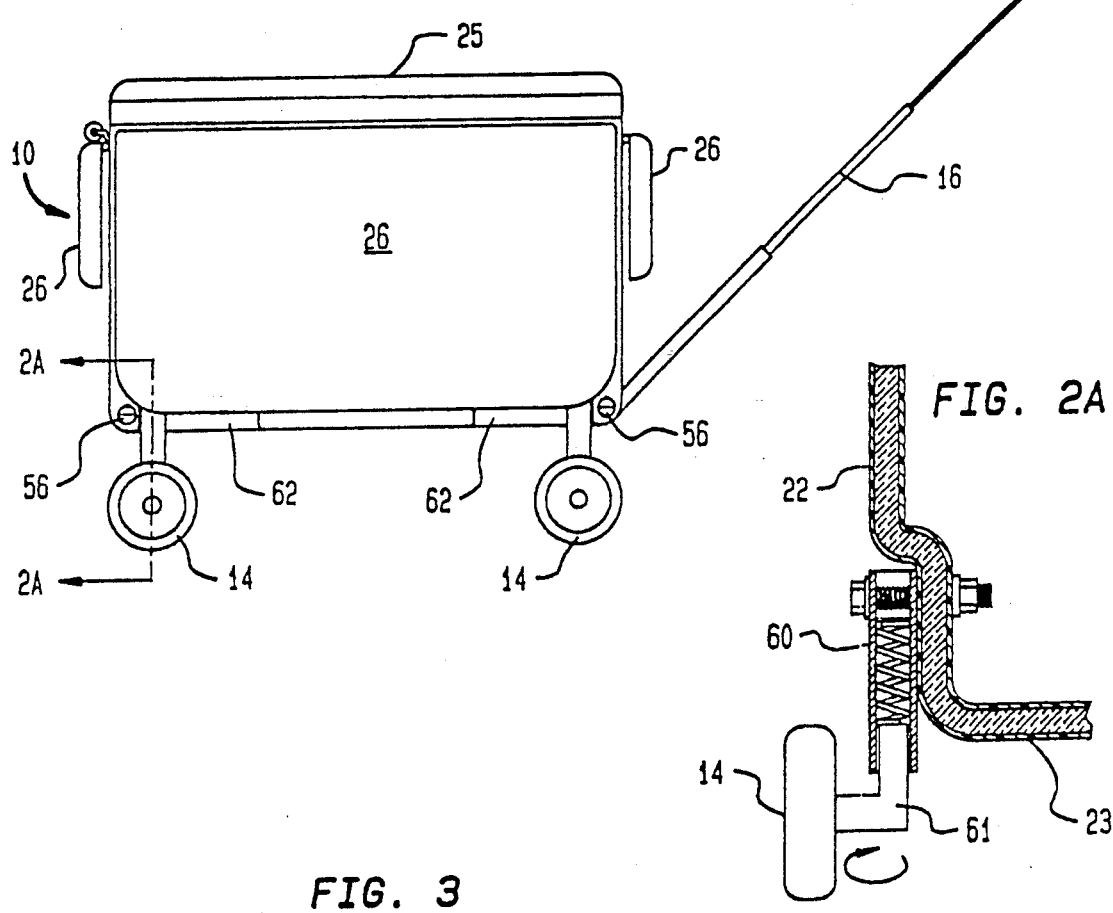
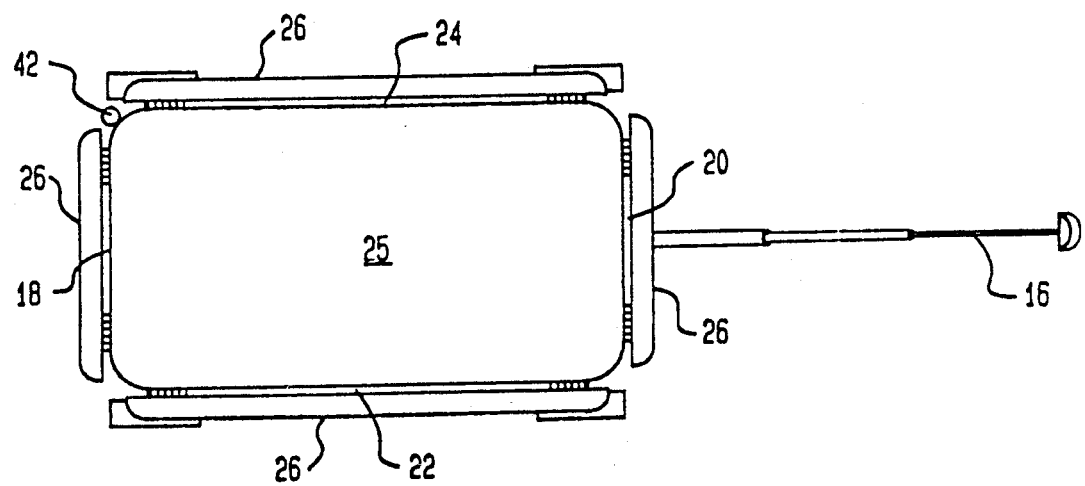

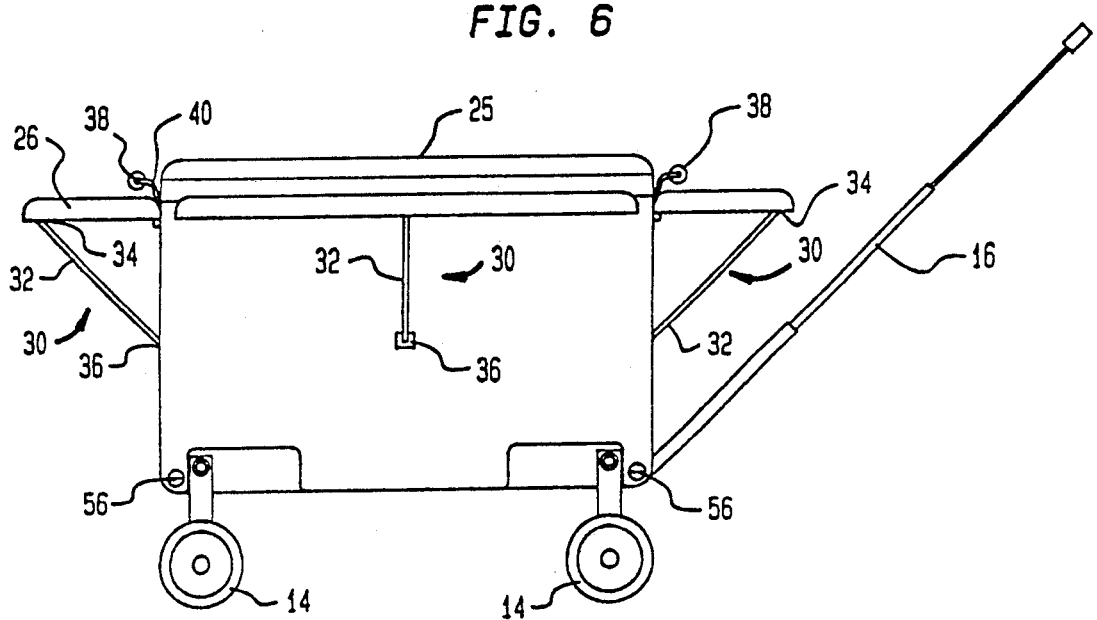
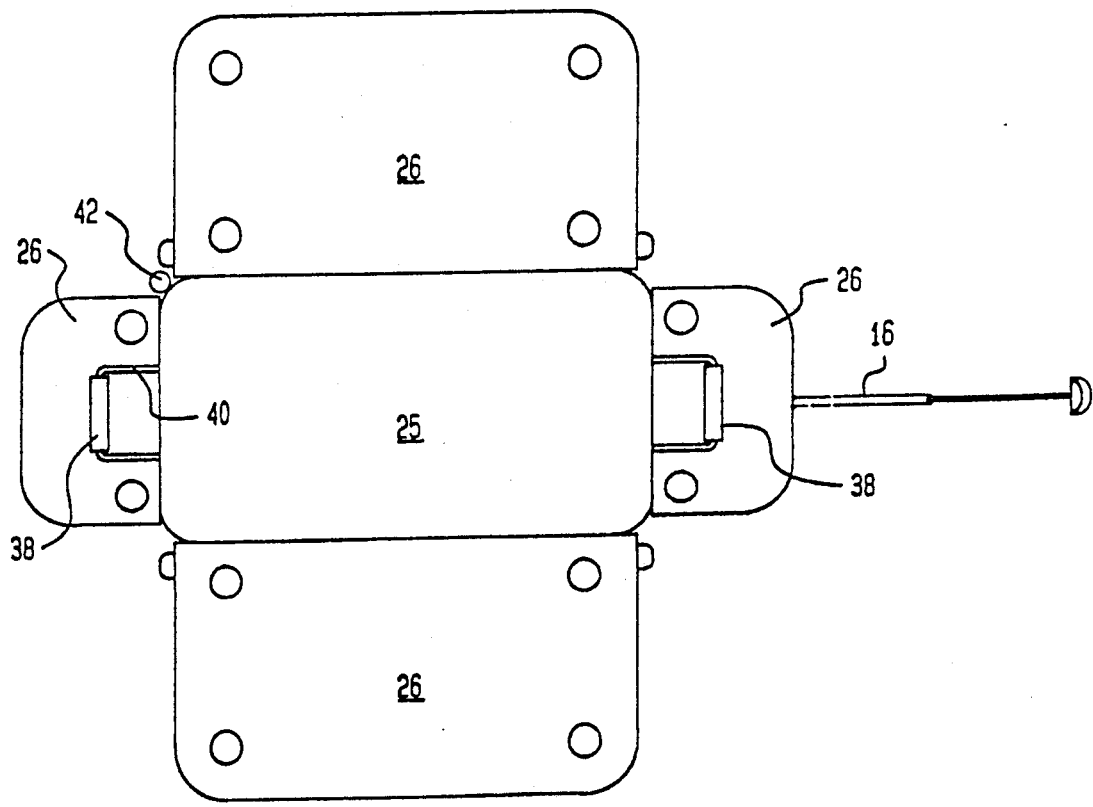

COOLER CADDY, AND METHODS OF CONSTRUCTING AND UTILIZING SAME

BACKGROUND OF THE INVENTION

1. Field of the Invention

The present invention relates to a device for transporting items such as food and utensils to outdoor events such as picnics, sporting events, etc. and providing a dining surface. More particularly, the invention relates to a mobile insulated container or caddy having associated therewith tray members which form a table-like structure when in their use position. The container includes, hingedly mounted thereon, all-terrain wheels for ease of movement of the caddy to the outdoor event. The container provides a carrying capacity for items such as beverages, foods and utensils. The container includes on its outer sides, tie hooks for securing a saddlebag to the device to increase the device's carrying capacity.

2. Description of the Relevant Art

It has become increasingly popular to picnic in places where a table or other support surfaces are not available. Typically, a cooler or other container is carried to the desired location. This can be very exhausting if the desired location is inconvenient to roads or other means of transportation.

U.S. Pat. No. 2,603,500 to Messier discloses a cart having wheels and handle, the cart having side "shelves" for horizontal eating surfaces. The cart includes an insulated container. However, this cart design would not be easily transported through loose dirt or sand.

U.S. Pat. No. 4,796,909 to Kirkendall discloses a cart which may support an ice chest. A storage pack may be secured over the ice chest. The wheels may be folded for storage. The cart adjusts in length to accommodate various sized loads.

U.S. Pat. No. 4,706,817 to Greathouse discloses a cart including a compartment, a folding shelf and folding wheels.

U.S. Pat. No. 4,887,836 to Simjian discloses a collapsible cart adapted to be stored in an automobile cart.

U.S. Pat. No. 3,944,241 to Epelbaum discloses a dual purpose device having folding wheels and telescopic handles.

Each of the above-mentioned devices fails to disclose or teach the advantages of the caddy device of the present invention.

SUMMARY OF THE INVENTION

The present invention provides means for transporting food and food related accessories. The invention has an insulated container, foods and related items stored therein, to transport such items to remote or inaccessible areas such as beaches, sporting events or other picnic areas. The container includes tray members hingedly secured on each side of the container to form eating surfaces for several individuals. Hingedly mounted to the bottom of the container are all-terrain wheels which pivot between a lower, in-use position and an upper, storage position.

In a preferred embodiment, the container further includes tray support means, a telescopic handle and an accessory pole support. The tray support means is adapted to selectively lock a tray into a horizontal use position. The telescopic handle is pivotably secured to the device to permit a motive force to be applied to the device. The accessory pole support is provided to secure a light or umbrella over the eating surface. The support is secured in a vertical position on the container and telescopes to an extended position.

It is an object of the present invention to provide a device which transports material over all types of terrain.

It is a further object of the present invention to provide an insulated container and several eating surfaces associated with the container.

It is a further object of the present invention to provide a device which includes folding members for easier storage of the device.

It is an even further object of the present invention to provide a saddlebag which attaches to the device for increasing carrying capacity.

The above and further objects, details and advantages of the invention will become apparent from the following detailed description, when read in conjunction with the accompanying drawing.

BRIEF DESCRIPTION OF THE DRAWING

FIG. 1 illustrates a perspective view of a mobile insulated container in accordance with the present invention.

FIG. 2 illustrates a side view of the mobile insulated container in accordance with the present invention.

FIG. 2A illustrates a cross-section taken along line 2A—2A shown in FIG. 2.

FIG. 3 illustrates a top view of the device in accordance with the present invention.

FIG. 6 illustrates a side view of the device with the tray means in the horizontal use position in accordance with the present invention.

FIG. 7 illustrates a top view of the device shown in FIG. 6 in accordance with the present invention.

DETAILED DESCRIPTION OF THE PREFERRED EMBODIMENTS

Figure 4:
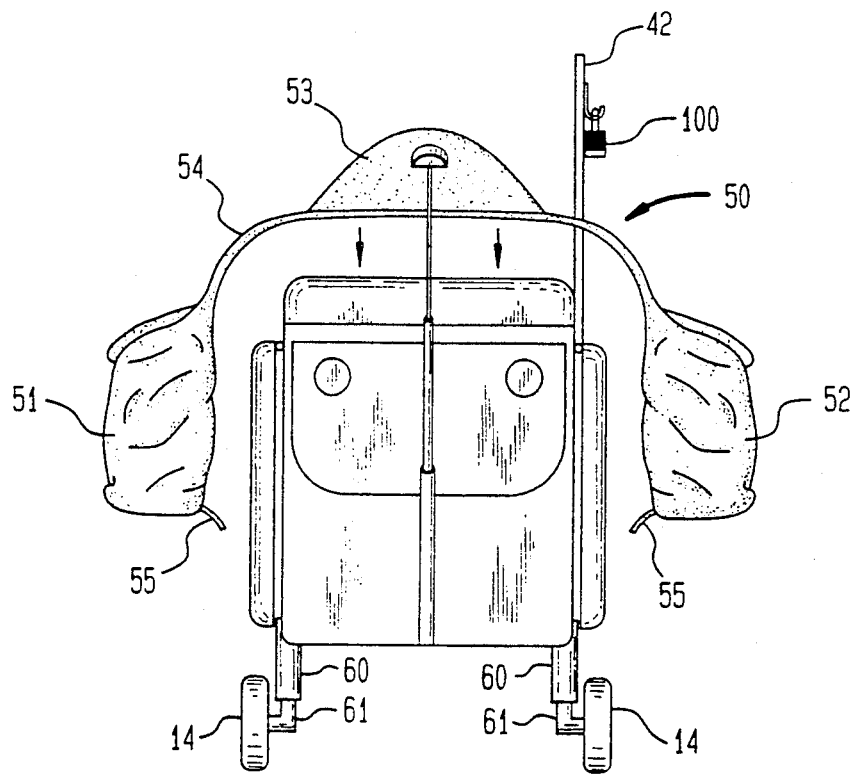
FIG. 4 illustrates a front view of the device in accordance with the present invention.

Referring now to the drawings and more particularly to FIG. 1 thereof, a portable insulated caddy device 10 is shown. The device 10 comprises a container portion 12 which is easily transported upon wheels 14. Motive force is provided via telescoping and folding handle 16.

As best seen in FIG. 3, the container portion 12 includes first and second end walls 18, 20, a pair of side walls 22, 24, a bottom 23 and a removable top member 25. Preferably, the walls 18, 20, 22, 24, bottom 23 and top 25 are insulated to retain cold or heat in the container, to keep foodstuffs which may be held in the container 10 from spoiling. Generally, this includes double-wall construction as shown in FIG. 2A. Hingedly secured to each sidewall at 21 is a tray means 26 movable between a horizontal use position and a vertical storage position (as seen in FIG. 2). Tray means 26 cooperate with top member 25 to provide an eating surface when the tray means are in the horizontal use position. The tray means 26 preferably include molded therein detent means 28 for retaining beverage containers. Tray means 26 attached to the end walls 18, 20 may be of a smaller size as shown by the dotted line in FIG. 2. The container 12 is preferably constructed as one-piece and sized to hold 36 quarts.

Figure 5:
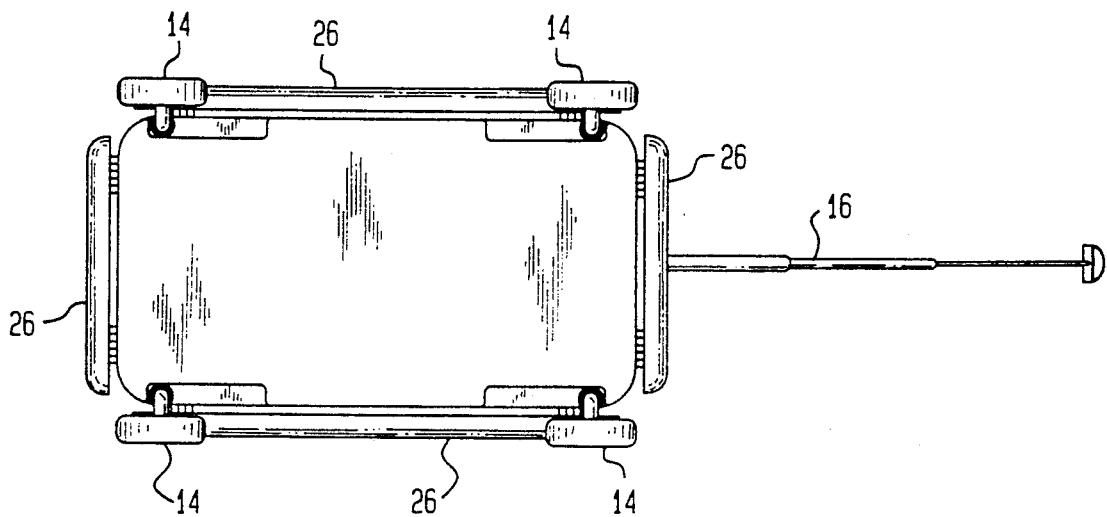
FIG. 5 illustrates a bottom view of a second embodiment of the device in accordance with the present invention.
Figure 5A:
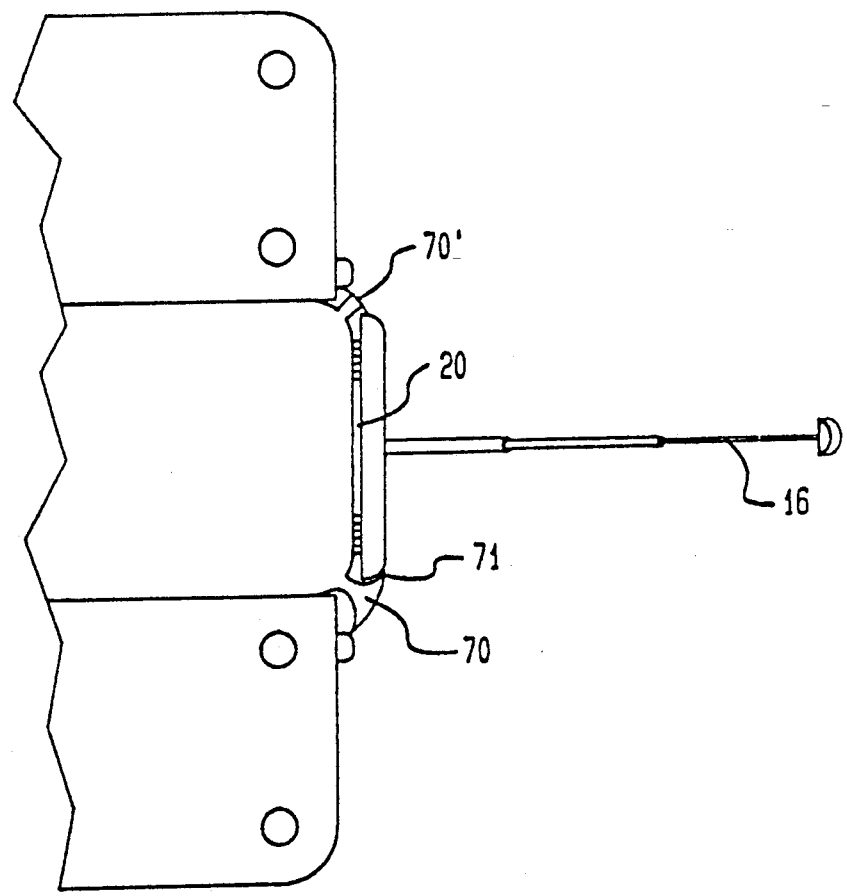
FIG. 5A illustrates a top view of the embodiment of FIG. 5.

As best seen in FIG. 5 and 5A, the caddy device 10 may include corner extensions 70 for extending the corners of the side walls outward to provide the appearance of a one-piece molded device. Essentially, extensions 70 form recesses into which the try means 26 fit. In addition, the corner extensions may provide a friction catch 71 to secure the tray means 26 in the non-use position. Optionally, other known catch means such as complementary VELCRO hook and loop members may be provided to hold the tray means 26 in the down, non-use position. A hand recess 72 may be provided to aid in lifting the tray means to the horizontal-use position. The corner extension 70 (FIG. 5A) would be provided if a catch means such as VELCRO hook and loop fasteners were to be employed to secure the tray means 26 to the container 12.

As best seen in FIG. 6, a support means or prop 30 is provided to lock each tray means 26 in the horizontal use position. Support means 30 comprises a rigid support member 32 hingedly secured to each tray means at a first end 34 thereof. The second end of the rigid member 32 is adapted to fit into a detent 36 in the sidewall of container 12. Optionally, a slot may be provided in the underside of each tray means into which the rigid member 32 fits when each tray means is folded down to the storage position. When each tray means 26 is locked in the horizontal use position by support means 30, the upper surface of each tray means 26 is level with the upper surface of top member 25 to form a table-like surface.

The device 10 is moved by using either telescoping handle 16 or extendable handles 38. Telescoping handle 16 is used to propel the device 10 when wheels 14 are in the downward position. As is well known, "telescoping" refers to the sections which slide or pass within another. The telescopic refers to the sections which slide or pass within another. The telescopic handle 16 has several sections which slide within another. The handle 16 is additionally hingedly secured to the container 12 to accommodate users of various heights and to permit the handle 16 to be stored. Extendable handles 38 are comprised of flexible members 40 having a rigid handle 38 secured thereto, the flexible members 40 allowing the handle 38 to be moved from beneath the tray means 26 for use.

At least three wheels 14 are hingedly or pivotally attached to the container 12 in a shock absorber 60 to permit the wheels 14 to move from an extended position where the wheels touch the ground, and a storage position, where the wheels are pivoted up to provide easy storage of the device 10. Preferably, four such wheels 14 are provided on container 12, the wheels 14 may pivot underneath the container 12 or upward adjacent the tray means 26 as shown by the dotted lines in FIG. 1. In addition, for increased maneuverability, the wheels pivot around post 61 to aid in turning the caddy 10. Recesses 62 may be provided on the side or bottom to accommodate the wheels 14. When wheels 14 are in the extended position, the top member 25 is at a height at which a seated individual would be comfortable eating from the tray means 26. Preferably, wheels 14 are "all-terrain" wheels which permit travel across sand, rocks, etc.

An auxiliary support pole or post member 42 (shown in FIG. 3 in the contracted or down position) which telescopes to an extended position to permit the attachment of an umbrella or light over the device 10 is also optionally provided on the container 12, preferably at a corner thereof.

Shown in FIG. 4 is a saddlebag 50 on caddy 10 which may be used to transport additional foodstuffs or accessories. Generally, the saddlebag 50 comprises a pair of bags 51, 52 joined together by a central portion 54. The central portion is sized to fit over the top member 25 to place bags 51, 52 on each side of the device 10. Optionally a third bag 53 may be provided on the central portion 54. Saddlebag 50 is secured to container 12 by attachment means 55 such as loops or catches on saddlebag 50 and corresponding attaching points 56 on the container 12. Bags 51, 52, 53 may be of the type closed by a zipper or other similar closing means. Post member 42 is shown with light 100.

An additional saddlebag securement means 66 may be provided on the top member 25. Complementary strips of VELCRO hook and loop material would be provided on top 25 and on the underside of the central portion 54. This additional securement means 66 will prevent lateral shifting of the saddlebag 50.

Attaching points 56 may also be employed to secure items such as lawn chairs to the top member 25 by looping a rope or string across the top of the chair or other item and attaching the ends of the rope or string to the attaching points 56. The attaching points 56 preferably are constructed into the side of the container as an indentation with a central securement member extending across the indentation.

Although there has been described what is at present considered to be preferred embodiments of the invention, it will be understood that various modifications and variations may be made therein, and it is intended to cover in the appended claims all such modifications as fall within the true spirit and scope of the invention.

I claim:

1. A device for conveying food and food related objects, comprising:
    an insulated container portion having four side walls, a bottom and a top member with a horizontal upper surface;
    at least one tray means hingedly secured to one of said side walls adapted to pivot between a vertical and horizontal position and having securement means thereon for fastening said at least one tray means in said horizontal position and further including a cooperating securement means on said side wall adjacent said tray means;
    said at least one tray means comprises four tray means, one tray means mounted on each said side wall, said tray means being substantially level with the upper surface of said top member when in said horizontal position and having molded therein detent means for accommodating beverage containers, and each of said tray means having a pair of inner corners proximate said top member;
    said top member having four corner extensions, each corner extension having a recess for receiving an inner corner of a respective tray means when the tray means is in the horizontal position;
    at least three wheels pivotally mounted to said insulated container; and
    a telescopic handle member for providing motive force to said device.

2. The device of claim 1, wherein:

said wheels moveable between a first storage position and a second extended position;

said extended position supporting said container and said storage position enabling said container to be stored; and said wheels mounted to said container via shock absorber arrangements.

3. The device of claim 2, wherein:

said container includes a telescoping post member mounted thereon.

4. The device of claim 3, wherein:

a saddlebag securable over said top member when said tray means are in said vertical position, said saddlebag providing additional capacity for transporting related items.

5. The device of claim 3, wherein:

carrying handles are provided extensible from opposite side walls.

6. The device of claim 3, wherein:

said post member comprises a telescoping pole which supports an umbrella.

7. The device of claim 3, wherein:

said post member comprises a telescoping pole which supports a light.

8. The device of claim 1, wherein:

said securement means comprises a rigid support member hingedly mounted at a first end to the underside of said tray means;

said cooperating securement means comprises a detent formed in said side wall accommodating the second end of said support member such that said tray means is secured in said horizontal position; and catch means for securing said tray means in said vertical position.

9. An insulated portable device capable of transporting items, comprising:

a container portion comprised of two end walls and two side walls, a bottom and a removable top member;

first and second tray means associated with each said end walls;

third and fourth tray means associated with each said side walls, said third and fourth tray means and said side walls being of substantially equal size;

each said tray means having a pair of inner corners proximate said top member and each said tray means being hingedly mounted to swivel between a vertical storage position and a horizontal use position, said top member having four corner extensions, each corner extension having a recess for receiving an inner corner of a respective tray means when the tray means is in the horizontal use position;

means for securing a saddlebag over said container when said tray means are in said vertical position, said saddlebag is substantially equal in size to said top member;

support means for locking said tray means in said horizontal use position equal to the height of said top member;

four wheels hingedly mounted adjacent said bottom of said container; and a handle for providing motive force to said device.

10. The device of claim 9, wherein:

said container is insulated; and said first and second tray means and said end walls being substantially equal in size.

11. The device of claim 9, wherein:

each said tray means includes detents formed therein so as to be on the top surface of said tray means to accommodate beverage containers when said tray means is in said horizontal use position.

12. The device of claim 9, wherein:

said first and second tray means being approximately one-half the size of said end walls.

13. The device of claim 11, wherein:

said four wheels are pivotable between a lower use position and an upper storage position.

14. The device of claim 17, wherein:

an auxiliary support pole vertically secured to said container which telescopes to an extended use position and a contracted storage position.

15. The device of claim 17, wherein:

said support means comprises a rigid prop member, one end of said prop member hinged to said tray means, a second end engaging a detent in said side wall and end wall to lock said tray means in said use position.

* * * * *

UNITED STATES PATENT AND TRADEMARK OFFICE
CERTIFICATE OF CORRECTION

PATENT NO. : 5,306,029
DATED : April 26, 1994
INVENTOR(S) : Ronald Robert Kaiser II It is certified that error appears in the above-indentified patent and that said Letters Patent is hereby corrected as shown below:

Column 3, line 8, change "try" to --tray--;

Column 3, lines 39-40, delete "The telescopic refers to the sections which slide or pass within another."

Signed and Sealed this

Twenty-sixth Day of July, 1994

Attest:

BRUCE LEHMAN

*Attesting Officer*    Commissioner of Patents and Trademarks